Figure 3:
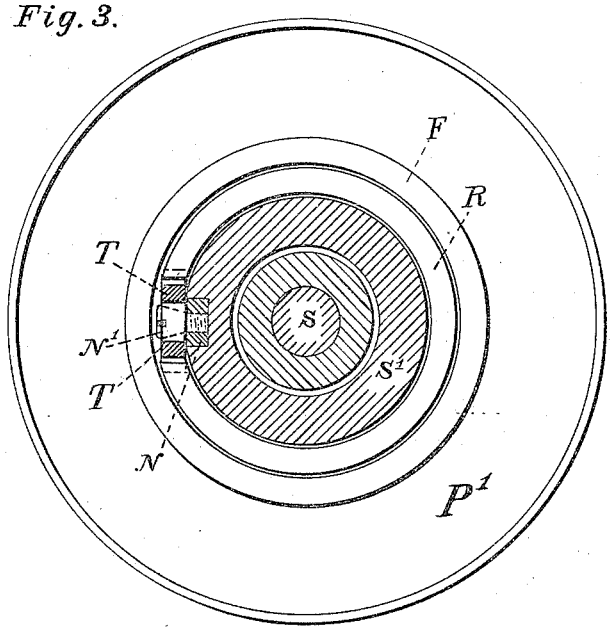

(No Model.)   2 Sheets—Sheet 1.
M. C. JOHNSON.
FRICTION CLUTCH.
No. 298,979.  Patented May 20, 1884.
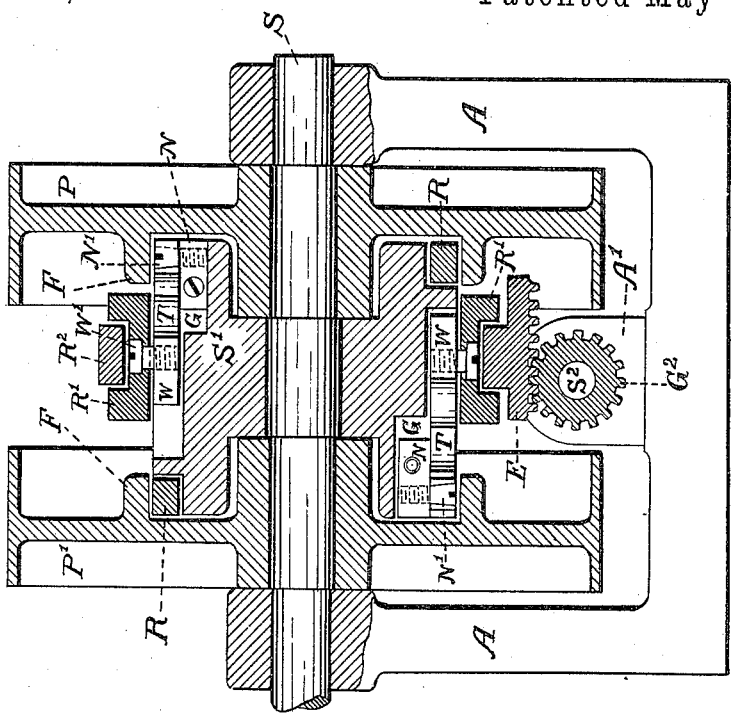
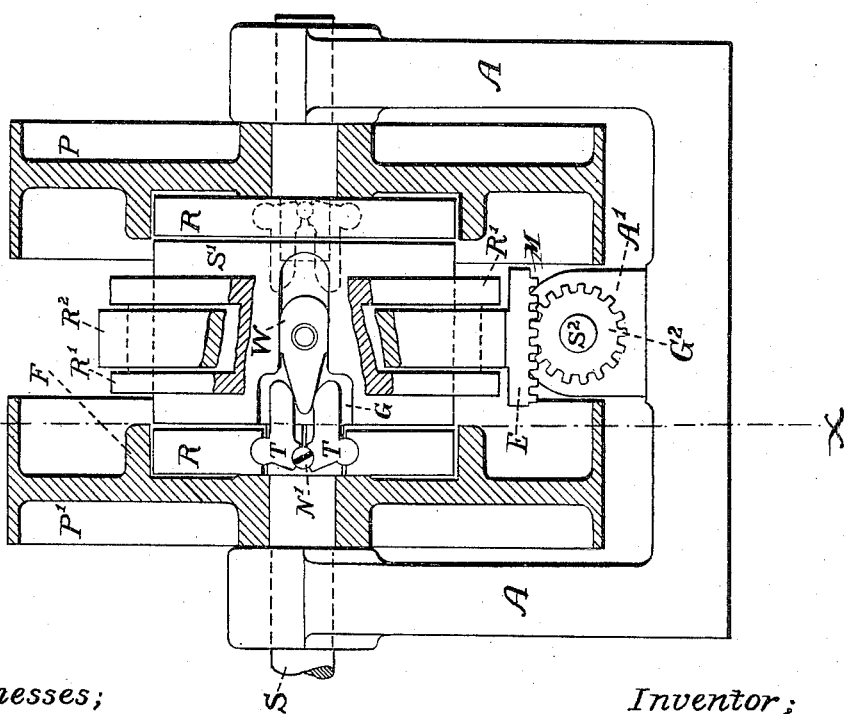
Witnesses:
C. O. Palmer.
H. W. Faulkner.
Inventor:
Moses C. Johnson.
by his Atty
F. H. Richards (No Model.) 2 Sheets—Sheet 2.

M. C. JOHNSON.
FRICTION CLUTCH.

No. 298,979. Patented May 20, 1884.

Witnesses;
C. O. Palmer.
H. W. Faulkner.

Inventor;
Moses C. Johnson,
by his Atty.,
F. N. Richards.

UNITED STATES PATENT OFFICE.

MOSES C. JOHNSON, OF HARTFORD, CONNECTICUT, ASSIGNOR TO THE PRATT & WHITNEY COMPANY, OF SAME PLACE.

FRICTION-CLUTCH.

SPECIFICATION forming part of Letters Patent No. 298,979, dated May 20, 1884.

Application filed March 10, 1884. (No model.)

*To all whom it may concern:*

Be it known that I, MOSES C. JOHNSON, a citizen of the United States, residing at Hartford, in the county of Hartford and State of Connecticut, have invented certain new and useful Improvements in Friction-Clutches, of which the following is a specification, reference being had to the accompanying drawings.

My invention relates to that class of friction-clutches having an expansible friction-ring operated from a sliding ring or equivalent part.

It has for its object to provide such a clutch adapted for use in back-geared lathe-heads, and in other places where but little room is available for it.

For the attainment of this object it consists in certain mechanism and combinations thereof hereinafter described, and illustrated in the drawings, in which—

Figure 5:
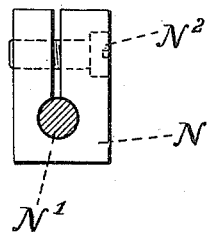
Figure 4:
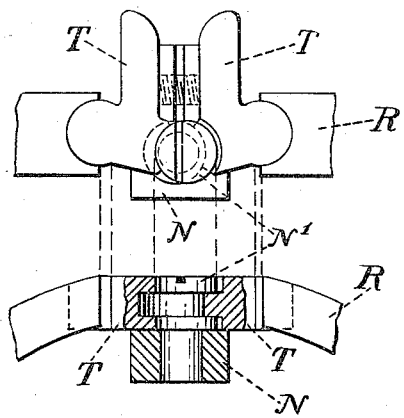

Figure 1 is a front elevation of a clutch mechanism embodying my invention, made partially in section the better to show the details thereof. Fig. 2 is a vertical longitudinal section of the same. Fig. 3 is a cross-section near line X X, showing a plan view of the expansible friction-ring R and one of the driving-wheels. Fig. 4 is an alternative construction of certain details. Fig. 5 is a plan view of the nut N.

Similar letters refer to similar parts throughout the several views.

A is any suitable frame-work, having one or more bearings for a driven shaft or spindle, S, and bearings A' for a pinion-shaft, $S^2$, which is hereinafter described.

Fitted to revolve freely upon shaft S are two wheels, P P'—usually but not always reversely driven—of which either one may be a pulley or a gear, as circumstances may require. Between these wheels the shaft S is enlarged by having formed or fixed thereon a ring-shaped part, S', which is preferably bored, substantially as shown, to permit a better and a longer bearing of the wheel-hubs upon that shaft, and is formed to carry upon each end thereof an expansible friction-ring, R. It has also grooves or channels G, for receiving certain minor parts of the mechanism hereinafter described. The friction-rings R have an external diameter equal to or nearly equal to the greatest diameter of S', and slightly smaller than the internal diameter of suitable friction-rims, F, that are formed on or fixed to wheels P and P'. Those friction-rings have a short portion cut out from one side thereof, the ends being formed to receive a pair of toggle-levers, T. The position of the ring R upon the part S' is such that the inner ends of those toggle-levers are contained within the wider part of the groove G, the central pivot of that pair of toggle-levers, which is the taper-headed screw N', being screwed into the block N, which is adapted to slide in the lower part of said groove. The block N is preferably split open at one end and provided with a clamping-screw $N^2$, Fig. 5, whereby the pivot-screw N' may be securely fixed therein. By screwing that pivot-screw a greater or a less distance into the nut N, owing to the taper of the head thereof, the length of the toggles, when straightened, may be increased or diminished, as desired, within limits determined by the construction and relative proportions of those several parts. By this means the expansion of the friction-rings R within the friction-rims F may be properly regulated. A wedge-carrying ring, R', is adapted to have a reciprocating motion longitudinally of the enlarged portion S' of shaft S, with which it rotates, between the friction-rings R, and to carry one or more wedges, which are suitably formed for operating the toggles T, and are secured to that ring by screws W'. The ring R' has a groove formed therein for receiving a non-rotating ring, $R^2$, which has a toothed rack, M, formed thereon or affixed thereto, that gears with a pinion, $G^2$, upon shaft $S^2$. This shaft is usually operated by a hand-lever, (not shown,) whereby a reciprocating motion may be imparted to the non-rotating ring, and thereby to the rotary one.

The operation of my improved friction-clutch will be obvious from the drawings and the preceding description. By turning the shaft $S^2$, as in Fig. 2, over toward the right hand, one of the friction-rings R is made to engage with the wheel P upon that end of shaft S, and thus impart a rotary motion to that shaft having the same direction and velocity as said wheel. By a reverse movement of shaft $S^2$ the wheel P' is similarly made to engage with the friction-ring upon the other end of S'.

I do not limit myself to a taper-headed screw or pin, as N' in Figs. 2 and 3, for the central pivot of the toggle-levers T; but I may use other forms thereof, or other devices equivalent thereto, for the purpose described. One such other form or device is shown in two views in Fig. 4, wherein the pivot N' is shown as a stud having separate oppositely-disposed sections bearing against each of said toggle-levers, and is clamped into the block N in the usual manner.

When my improved friction-clutch is used in a lathe-head, the wheel P is a spur-wheel and the wheel P' is a cone-pulley, the distance between them being reduced as much as possible, and leave sufficient space for the shaft $S^2$ and for operating the reciprocating rings. In that case both of the said wheels are usually driven in the same direction but with different velocities, the clutch being used to change the velocity of the spindle S, not to reverse the direction of its motion.

Having thus described my invention, I claim as new and desire to secure by Letters Patent—

1. In a friction-clutch, in combination, the friction-ring R, toggle-levers T, a block, N, and the taper-head screw N', substantially as and for the purpose described.

2. In a friction-clutch mechanism, in combination, the ring R', the ring $R^2$, having a rack, M, and a shaft, $S^2$, having a pinion gearing with that rack, combined and operating substantially as described.

3. In a friction-clutch mechanism, a shaft, S, having an enlarged portion, S', a wheel and friction devices upon said shaft, at each side of the said enlarged portion thereof, a ring, as R', adapted to have a reciprocating motion upon the enlarged portion of said shaft, ring $R^2$, shaft $S^2$, rack E, and pinion $G^2$, combined and operating substantially as described.

MOSES C. JOHNSON.

Witnesses:
F. H. RICHARDS,
AMOS WHITNEY.